United States Patent
Maekawa et al.

(10) Patent No.: US 6,886,652 B2
(45) Date of Patent: May 3, 2005

(54) TORQUE DISTRIBUTION CONTROL DEVICE FOR FOUR-WHEEL DRIVE VEHICLE

(75) Inventors: Akio Maekawa, Okazaki (JP); Yasushi Yamada, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/759,150

(22) Filed: Jan. 20, 2004

(65) Prior Publication Data

US 2004/0168846 A1 Sep. 2, 2004

(30) Foreign Application Priority Data

Feb. 28, 2003 (JP) ........................................ 2003-054056

(51) Int. Cl.⁷ ............................................ B60K 17/344
(52) U.S. Cl. ........................................ 180/248; 701/89
(58) Field of Search ................................ 180/248, 249, 180/247, 250, 233; 701/89

(56) References Cited

U.S. PATENT DOCUMENTS

| | | | | |
|---|---|---|---|---|
| 4,936,406 A | * | 6/1990 | Tezuka et al. | 180/249 |
| 5,450,919 A | * | 9/1995 | Shitani | 180/233 |
| 5,655,618 A | * | 8/1997 | Wilson et al. | 180/197 |
| 6,497,301 B2 | * | 12/2002 | Iida et al. | 180/249 |
| 6,698,541 B2 | * | 3/2004 | Sakakiyama | 180/233 |

FOREIGN PATENT DOCUMENTS

JP          2001-71781          3/2001

* cited by examiner

Primary Examiner—Daniel G. DePumpo
(74) Attorney, Agent, or Firm—Oblon, Spivak, McClelland, Maier & Neustadt, P.C.

(57) ABSTRACT

A torque distribution control device for a four-wheel drive vehicle is disclosed, wherein a torque transmitted from an engine to prime drive wheels is distributed by an electromagnetic clutch to sub-drive wheels on an on-demand basis. A pre-torque is determined based on a vehicle speed and a throttle opening degree in a feed-forward sense. A compensation torque is determined based on the rotational speed difference between the prime drive wheels and the sub-drive wheels and the vehicle speed in a feedback sense. The pre-torque and the compensation torque are added for a command torque, depending on which the electromagnetic clutch is controlled to transmit the torque from the engine to the sub-drive wheels. At this time, since the command torque is limited to an upper limit value therefor or below in dependence on the engine torque, an ECU can be prevented from applying an excess current to an electromagnetic coil of the electromagnetic clutch and hence, from generating heat to raise its temperature when the engine torque is small.

4 Claims, 5 Drawing Sheets

TORQUE DISTRIBUTION CONTROL DEVICE FOR FOUR-WHEEL DRIVE VEHICLE

INCORPORATION BY REFERENCE

This application is based on and claims priority under 35 U.S.C. sctn. 119 with respect to Japanese Application No. 2003-54056 filed on Feb. 28, 2003, the entire content of which is incorporated herein by reference.

BACKGROUND OF THE INVENTION

1. Field of the Invention

The present invention relates to a torque distribution control device for controlling the distribution of a drive torque to sub-drive wheels of a four-wheel drive vehicle.

2. Discussion of the Related Art

A torque distribution control device for a four-wheel drive vehicle has been known as described in Japanese unexamined, published patent application No. 2001-71781, wherein an electromagnetic clutch is provided for distributing the torque transmitted from an engine to prime drive wheels, to sub-drive wheels in dependence on a rotational speed difference between the prime drive wheels and the sub-drive wheels. In the known control device, when the acceleration of the vehicle exceeds a predetermined value, there is selected an acceleration mode map which has been set to enlarge the rate of the increase in the command torque distributed to the sub-drive wheels to the increase in the rotational speed difference between the prime drive wheels and the sub-drive wheels. As a consequence, when the rotational speed difference is large, a large electric current is applied to an exciting coil of the electromagnetic clutch, whereby the same transmits a large command torque to the sub-drive wheels.

However, in the known control method, even when the engine torque remains small, it often occurs that in dependence on the driving manipulation or the traveling state, a large command torque is calculated thereby to cause a large electric current to flow through the exciting coil of the electromagnetic clutch. This causes a control device (ECU) to generate heat, which in turn causes circuit elements such as resistances, condensers and so on to vary their characteristics. As a result, the accuracy in controlling the electric current to be applied to the exciting coil is lowered, so that it becomes impossible to precisely perform the torque distribution to the sub-drive wheels. For measures against this drawback, it becomes necessary to use those circuit elements which have small temperature variations of their characteristics, thereby resulting in disadvantage in respect of increasing the manufacturing cost.

SUMMARY OF THE INVENTION

Accordingly, it is a primary object of the present invention to provide an improved torque distribution control device for a four-wheel drive vehicle which is of low cost and high precision and which is capable of preventing an electronic control device from generating heat by controlling electric current not to be applied excessively to an electromagnetic coil of an electromagnetic clutch.

Briefly, according to the present invention, there is provided a torque distribution control device for a four-wheel drive vehicle having an electromagnetic clutch for distributing to sub-drive wheels a torque transmitted from an engine to prime drive wheels and current apply means for applying a command electric current corresponding to a command torque, to an electromagnetic coil of the electromagnetic clutch. The torque distribution control device comprises command torque operation means for determining the command torque based on a vehicle speed, a throttle opening degree and a rotational speed difference between the prime drive wheels and the sub-drive wheels; and command torqu limit processing means for limiting the command torque to an upper limit value therefor or below in dependence on an engine torque.

With this configuration, the torque transmitted from the engine to the prime drive wheels is distributed through the electromagnetic clutch to the sub-drive wheels on an on-demand basis. The command torque is determined based on the vehicle speed, the throttle opening degree and the rotational speed difference between the prime drive wheels and the sub-drive wheels. The electromagnetic clutch is controlled in dependence on the command torque and transmits the engine torque depending on the command torque to the sub-drive wheels. At this time, since the command torque is limited to the upper limit value therefor or below in dependence on the engine torque detected then, an ECU can be prevented from applying an excess current to an electromagnetic coil of the electromagnetic clutch and hence, from generating heat to raise its temperature when the engine torque is small. Thus, it becomes no longer necessary to use those circuit elements having small characteristic changes over a wide temperature range, so that the torque distribution control device can be precise in control operation and can be manufactured at a low cost.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
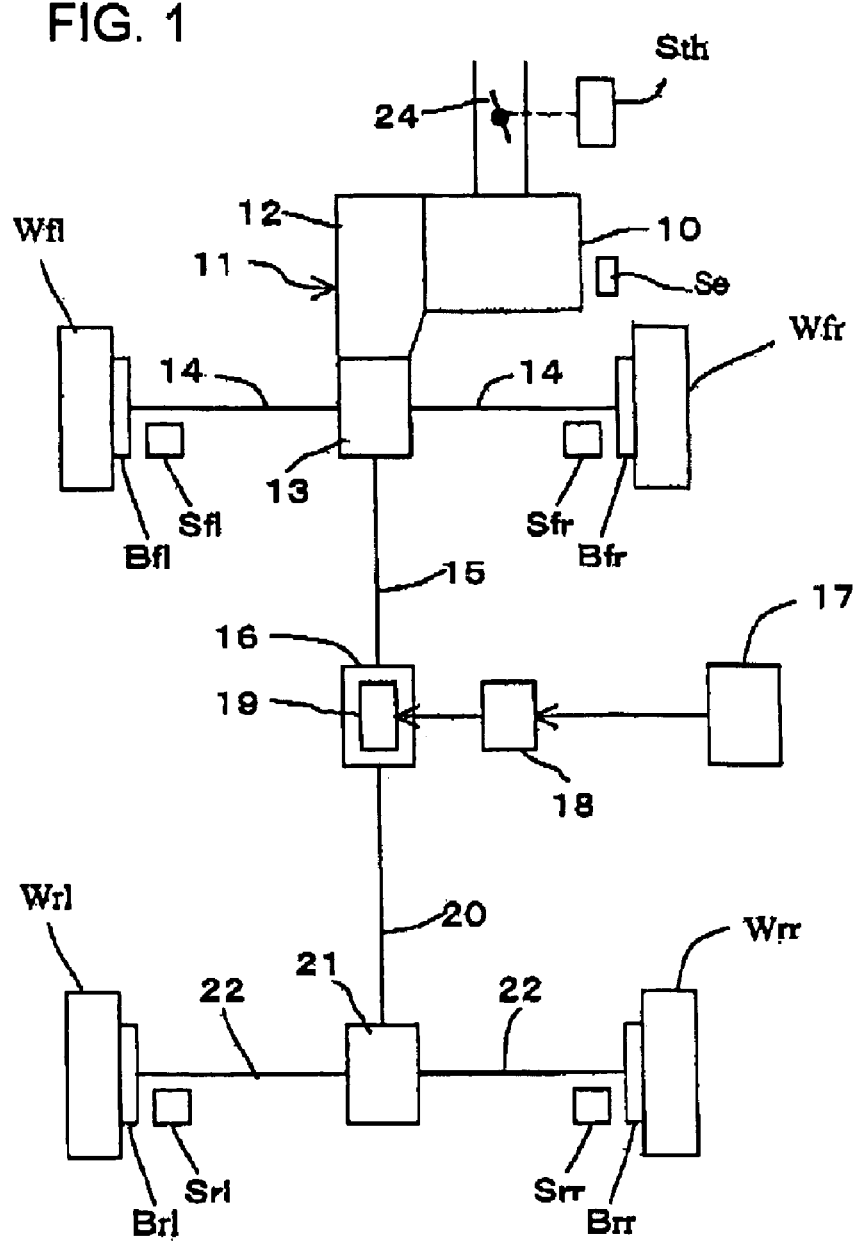
FIG. 1 is a conceptual representation of a torque distribution control device for a four-wheel drive vehicle in an embodiment according to the present invention.

An embodiment of the present invention will be described with reference to the accompanying drawings. FIG. 1 schematically shows the construction of a four-wheel drive vehicle, which incorporates a torque distribution control device pertaining to the embodiment of the present invention. In FIG. 1, a transaxle 11 is assembled at an output side of an engine 10. The transaxle 11 integrally incorporates a transmission 12, a transfer and a front differential 13 therein. The transaxle 11 outputs the output torque of the engine 10 through the front differential 13 to front axle shafts 14, 14 to drive right and left front wheels Wfr, Wfl as prime drive wheels and further to a first propeller shaft 15. The first propeller shaft 15 is connected to a second propeller shaft 20 through an electromagnetic clutch 16. The electromagnetic clutch 16 is controlled in dependence on a command torque which an electronic control device 17 determines in dependence on the traveling state of the vehicle, thereby to distribute the engine torque to right and left rear wheels Wrr, Wrl as sub-drive wheels through the second propeller shaft 20. An electric current control circuit 18 applies to an exciting or electromagnetic coil 19 of the electromagnetic clutch 16 a command current corresponding to the command torque determined by the control device 17. The electromagnetic clutch 16 pressures and connects plural clutch plates in dependence on the command current, so that the engine torque is transmitted from the first propeller shaft 15 to the second propeller shaft 20. The engine torque transmitted to the second propeller shaft 20 is further transmitted to the rear differential 21 and is output from the rear differential 21 to the rear axle shafts 22, 22 to be distributed to the right and left rear wheels Wrr, Wrl as the sub-drive wheels. Wheel speed sensors Sfl, Sfr, Srl, Srr are provided respectively for detecting the wheel speeds of the prime drive wheels Wfl, Wfr and the sub-drive wheels Wrl, Wrr. The wheel speed sensors Sfl, Sfr, Srl, Srr also operate as wheel speed sensors for an anti-lock brake system (ABS) for controlling the brakes Bfl, Bfr, Brl, Brr independently of one another. Further, a throttle body in an intake system for the engine 10 is provided with a throttle opening sensor Sth for detecting the opening degree ($\theta$) of a throttle valve 24, which adjusts the intake volume in dependence upon the stepping-on measurement of an accelerator or gas pedal (not shown). The engine 10 is provided with an engine rotational speed sensor Se for detecting the rotational speed of the engine 10. A torque distribution device for distributing to the sub-drive wheels Wrl, Wrr the torque transmitted from the engine 10 to the prime drive wheels Wfl, Wfr is composed of the electric current control circuit 18, the electromagnetic clutch 16 and so on.

Figure 2:
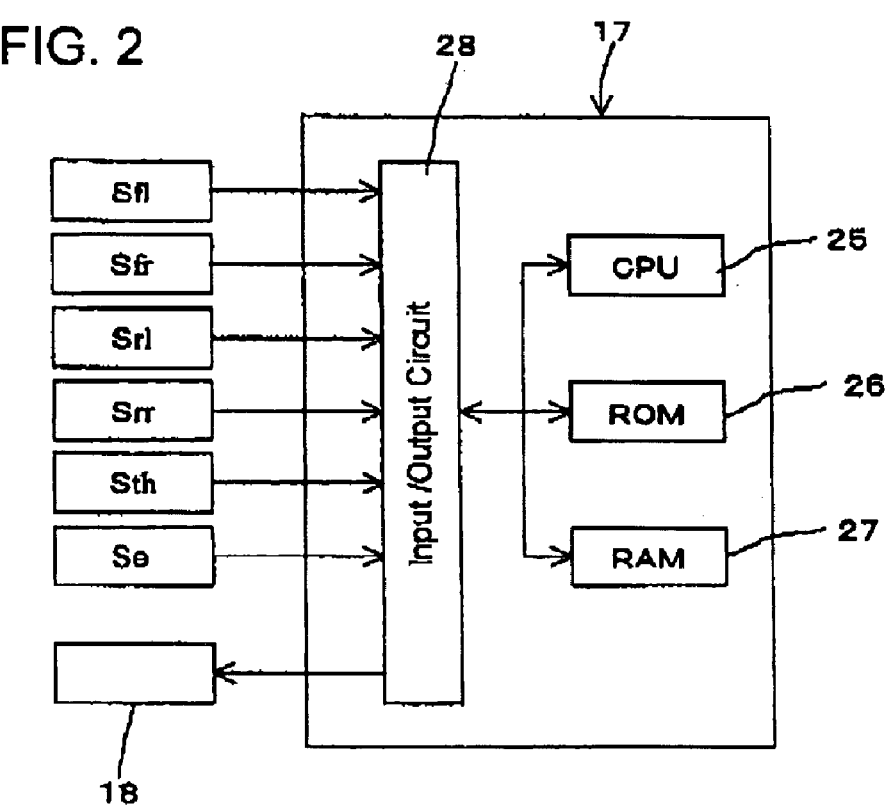
FIG. 2 is a block diagram of an electronic control circuit in the embodiment.
Figure 6:
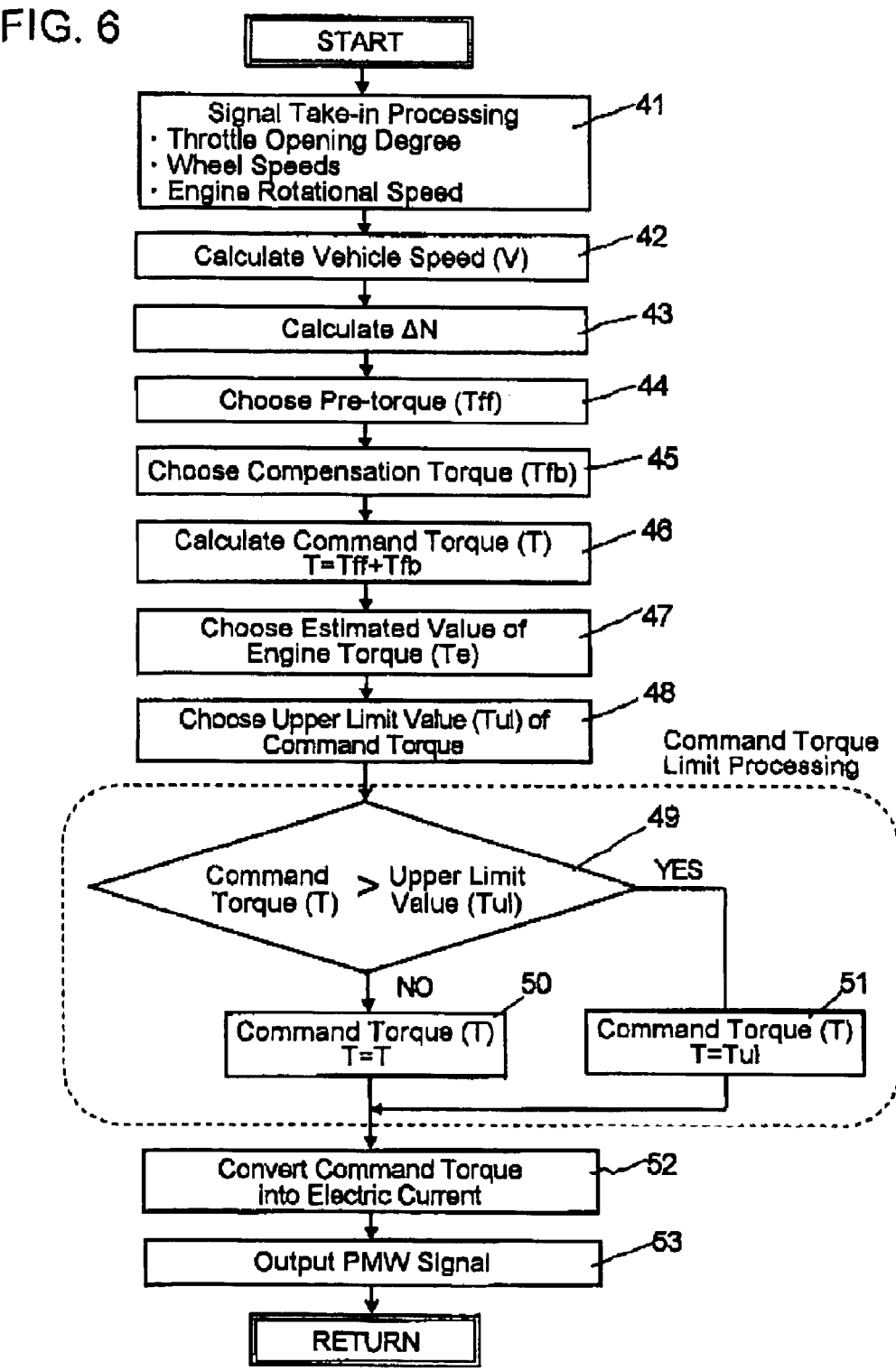
FIG. 6 is a flow chart showing a torque distribution control program executed by the electronic control circuit in the embodiment.

Referring now to FIG. 2, the electronic control circuit 17 is shown connected to the wheel speed sensors Sfl, Sfr, Srl, Srr, the throttle opening sensor Sth and the engine rotational speed sensor Se and is further connected to the electric current control circuit 18 called "ECU" in this technological field. The electronic control circuit 17 is composed of a CPU 25 for executing various kinds of operation processing to control the torque distribution device, a ROM 26 which in advance has stored a torque distribution control program shown in FIG. 6 executed by the CPU 25, a RAM 27 with which the read-out and write-in of data as required are carried out during the execution by the CPU 25 of the torque distribution control program, and an input/output circuit 28 for inputting thereinto the wheel speed signals, the throttle opening degree signal and the engine speed signal from the wheel speed sensors Sfl, Sfr, Sri, Srr, the throttle opening sensor Sth and the engine rotational speed sensor Se and for outputting a command electric current (I) to the electric current control circuit 18 as a result of the operations executed by the CPU 25.

Figure 3:
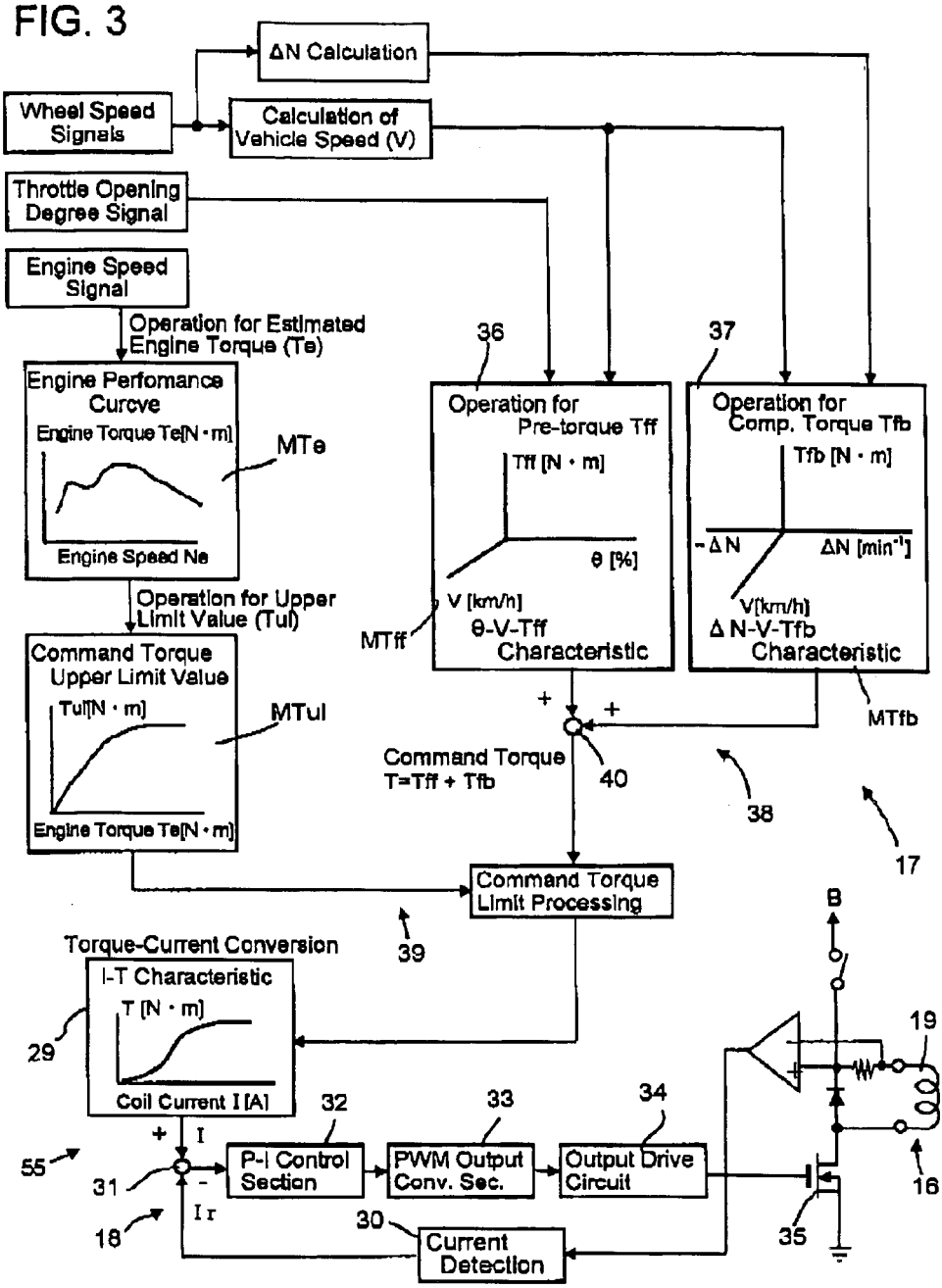
FIG. 3 is a block diagram showing the functions of those constituting the torque distribution control device for the four-wheel drive vehicle in the embodiment.

As shown in FIG. 3, the electronic control device 17 determines or calculates a command current (I) which is to be applied to the electromagnetic coil 19 for transmission by the electromagnetic clutch 16 of the calculated command torque (T) to the sub-drive wheels Wrl, Wrr, and outputs the calculated command current (I) to the electric current control circuit 18. The relation between the command torque (T) and the command electric current (I) has been stored in the ROM 26 in the form of a torque-current map 29, and a command electric current (I) corresponding to the command torque (T) is chosen or read out from the torque-current map 29. In a modified form, the command current (I) may be calculated using an algebraic expression or equation which formulates the relation between the command torque (T) and the command electric current (I).

In the electric current control circuit or ECU 18, a current detection section 30 detects the real electric current (Ir) flowing through the electromagnetic coil 19 of the electromagnetic clutch 16, and a subtraction section 31 calculates a difference between the command current (I) input from the electronic control device 17 and the real electric current (Ir). The calculated difference is amplified by a P–I control section 32 and is processed by a PWM output converter section 33 for pulse width modulation. Thus, a voltage under the pulse wide modulation is applied from the output drive section 34 to a base of a switching transistor 35. Since the switching transistor 35 is connected to a buttery (B) in series with the electromagnetic coil 19, the command electric current (I) is applied to the electromagnetic coil 19. The torque-current map 29, the electric current control circuit 18 and the like constitute current apply means 55 for applying to the electromagnetic coil 19 of the electromagnetic clutch 16 a command current (I) which is necessary for the electromagnetic clutch 16 to transmit an engine torque corresponding to the command torque (T).

The electronic control device 17 is provided with command torque operation means 38, which is composed of pre-torque operation means 36 for operating or determining a pre-torque (Tff) based on the vehicle speed (V) and the throttle opening degree ($\theta$). The command torque operation means 38 is further composed of compensation torque operation means 37 for operating or determining a compensation torque (Tfb) based on the vehicle speed (V) and a rotational speed difference ($\Delta N$) between the prime drive wheels Wfl, Wfr and the sub-drive wheels Wrl, Wrr, and addition means 40 for calculating a command torque (T) by the addition of the pre-torque (Tff) and the compensation torque (Tfb). The electronic control device 17 is further provided with command torque limit processing means 39 for limiting the command torque (T) to an upper limit value therefor or below based on an estimated engine torque (Te) referred to later. The vehicle speed (V) is represented by the wheel circumferential speed that is calculated from the average value of rotational speeds of the sub-drive wheels Wrl, Wrr detected by the wheel speed sensors Srl, Srr. The throttle opening degree signal ($\theta$) represents by percentage the opening degree detected by the throttle sensor Sth of the throttle valve 24 relative to the full opening thereof.

Figure 4:
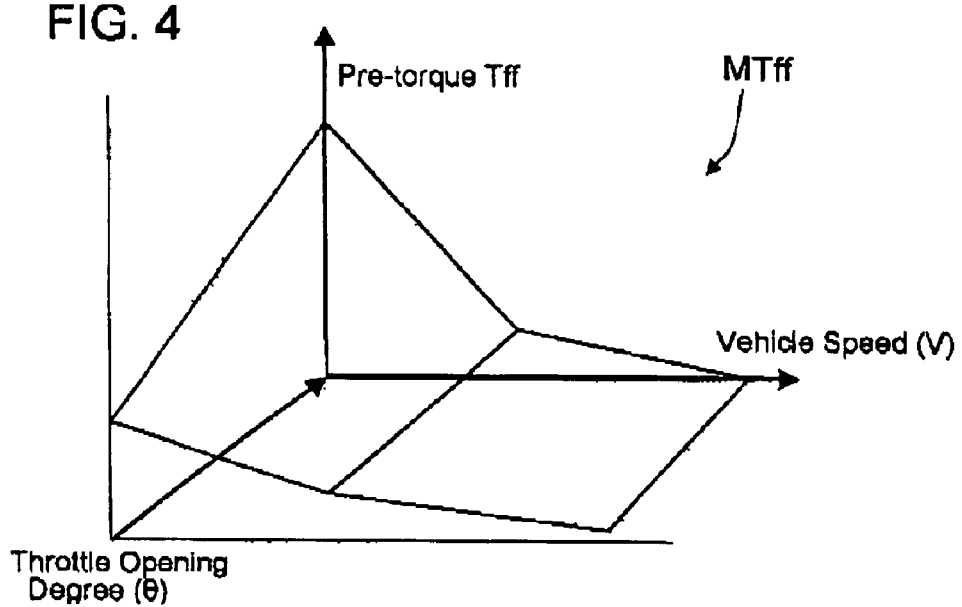
FIG. 4 is an explanatory view representing one example of a pre-torque map used in the embodiment.

In the pre-torque operation means 36, a pre-torque map MTff is registered in the ROM 26 for setting various pre-torques in dependence on various vehicle speeds (V) and various throttle opening degrees ($\theta$), and when the torque distribution control program is executed as described later in detail, a pre-torque which corresponds to a detected vehicle speed (V) and a detected throttle opening degree ($\theta$) is chosen or read out from the pre-torque map MTff. The pre-torque map MTff is exemplified in FIG. 4 and has a general characteristic that the pre-torque Tff is large at around zero of the vehicle speed (V) and decreases as the vehicle speed (V) increases so far as the same does not reach a predetermined speed and that the rate of the increase in the pre-torque Tff to the increase in the throttle opening degree (θ) is large. The map MTff has been further set so that in another speed zone beyond the predetermined speed, the pre-torque Tff is small, and the rate of the increase in the pre-torque Tff to that in the throttle opening degree (θ) is also small, in a modified form, the pre-torque Tff, instead of being obtaining from the pre-torque map MTff, may be calculated using a predetermined algebraic expression based on the vehicle speed (V) and the throttle opening degree (θ).

Figure 5:
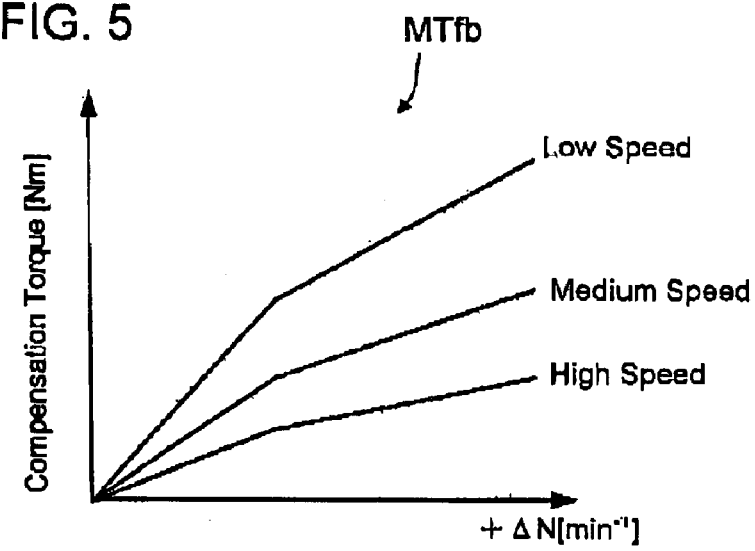
FIG. 5 is an explanatory view representing one example of a compensation torque map used in the embodiment.

In the compensation torque operation means 37, a compensation torque map MTfb is registered in the ROM 26, wherein various compensation torques (Tfb) have been set in correspondence to the various rotational speed differences (ΔN) between the prime drive wheels Wfl, Wfr and the sub-drive wheels Wrl, Wrr and various vehicle speeds (V). When the torque distribution control program is executed as described later, a compensation torque (Tfb) is obtained from the compensation torque map MTfb based on a detected rotational speed difference (ΔN) between the prime drive wheels Wfl, Wfr and the sub-drive wheels Wrl, Wrr and a detected vehicle speed (V). As shown in FIG. 5, in the compensation torque map MTfb, various compensation torques (Tfb) relative to various rotational speed difference (ΔN) have been set with plural vehicle speeds (V) as parameters. The compensation torque map MTfb has a general characteristic that the compensation torque (Tfb) is zero when the rotational speed difference (ΔN) between the drive wheels and the sub-drive wheels is zero, and that as long as the rotational speed difference (ΔN) is of the positive-going, the compensation torque (Tfb) increases along a constant inclination in proportion to the increase in the rotational speed difference (ΔN), but the inclination of the increase in the the compensation torque (Tfb) is made small when the rotational speed difference (ΔN) exceeds a predetermined value. The compensation torque (Tfb) has been set to be larger as the vehicle speed (V) decreases, but smaller as the vehicle speed (V) increases.

In the command torque limit processing means 39, the ROM 26 has registered therein an engine torque map MTe for indicating various estimated engine torques (Te) which are estimated respectively from various engine rotational speeds (Ne) and a command torque upper limit value map MTul for indicating various upper limit values (Tul) in relation to various engine torques (Te). When the torque distribution control program is executed as referred to later, an estimated engine torque (Te) corresponding to a detected engine rotational speed (Ne) is chosen or read out from the engine torque map MTe, and then an upper limit value (Tul) for a command torque (T) corresponding to the read-out engine torque (Te) is chosen or read out from the command torque upper limit value map MTul, so that the command torque (T) determined by the command torque operation means 38 is limited to the readout upper limit value (Tul) or below. As shown in FIG. 3, the engine torque map MTe uses an engine performance curve which represents various maximum torques of the engine 10 in connection to various engine rotational speeds (Ne), and the various upper limit values (Tul) for the various command torques (Te) are set based on the various maximum torques.

The operation of the torque distribution control device for a four-wheel drive vehicle as constructed above will be described hereinafter. The CPU 25 executes the torque distribution program shown in FIG. 6 at a minute time interval (Δt). First of all, the CPU 25 at step 41 executes a processing for taking therein the signals from the wheel speed sensors Sfl, Sfr, Srl, Srr, the throttle sensor Sth and the engine rotational speed sensor Se. Then, at step 42, the vehicle speed (V) is calculated based on the average value of rotational speeds of the sub-drive wheels Wrl, Wrr detected by the wheel speed sensors Srl, Srr. At step 43, the average value of the rotational speeds of the sub-drive wheels Wrl, Wrr is subtracted from the average value of the rotational speeds of the prime drive wheels Wfl, Wfr detected by the wheel speed sensors Sfl, Sfr to calculate a rotational speed difference (ΔN) between the prime drive wheels and the sub-drive wheels. Then at step 44, a pre-torque Tff which meets the calculated vehicle speed (V) and a throttle opening degree (θ) detected by the throttle opening sensor Sth is read out from the pre-torque map MTff in a feed forward sense. A compensation torque (Tfb) which meets the rotational speed difference (ΔN) and the vehicle speed (V) is chosen or determined in a feedback sense at step 45. The pre-torque Tff and the compensation torque Tfb are added to calculate a command torque (T) at step 46. Then, an engine torque (Te) estimated from the detected engine rotational speed (Ne) is read out from the engine torque map MTe at step 47, and a command torque upper limit value (Tul) meeting the read-out engine torque (Te) is read out from the command torque upper limit map MTul at stet 48. It is then judged at step 49 whether the command torque (T) is larger than the read-out command torque upper limit value (Tul) or not. If it is smaller than the upper limit value (Tul), that is, if the answer is "NO", th command torque (T) calculated at step 46 is set as a command torque (T) to be applied to the current apply means 55. If the command torque (T) is larger than the command toque upper limit value (Tul), that is, the answer is "YES", on the contrary, the command toque upper limit value (Tul) is set at step 51 as a command torque (T) to be applied to the current apply means 65. In order for the electromagnetic clutch 16 to transmit an engine torque corresponding to the command torque (T) set at step 50 or 51, a command electric current (I) which is to be applied to the electromagnetic coil 9 is read out at step 52 from the torque-current map 29 which has stored various command currents (I) respectively corresponding to various command torques (T) and then, is output to the electric current control circuit 18 at step 53. The electric current control circuit 18 amplifies the difference between the command current (I) and the real electric current (Ir) flowing through the electromagnetic coil 19 of the electromagnetic clutch 16 and modulates the amplified difference into a corresponding pulse width signal. The control circuit 18 further outputs the pulse width signal to a switching transistor 35 thereby to apply the command current (I) to the electromagnetic coil 19. Thus, the electromagnetic clutch 16 transmits an engine torque depending on the command torque (T) from the first proper shaft 15 to the second proper shaft 20 to distribute such an engine torque to the rear wheels Wrl, Wrr as the sub-drive wheels.

As a result, when the engine torque (Te) is small, the command torque (T) is limited to an upper limit value (Tul) or below which is set also small to meet the small engine torque (T). This advantageously prevents the electric current control circuit or ECU 18 from applying an excess current to the electromagnetic coil 19 and hence, from generating heat to raise its temperature. Therefore, since the ECU 18 can be restrained from generating heat, it becomes unnecessary to employ those circuit elements which have small characteristic variations over a wide temperature range, so that the ECU 18 is not only able to control electric current precisely but also able to be manufactured at a low cost.

Although the engine performance curve is used as an engine torque map MTe in the foregoing embodiment, it may be replaced by an engine torque map which is registered in the ROM 26 with various engine torques (Te) being stored in relation with various engine rotational speeds (Ne) and various throttle opening degrees (E). Or, there may be used an algebraic expression for calculating the engine torque (Te) based on the engine rotational speed (Ne) and the throttle opening degree (θ). Further, the estimate engine torque (Te) may be determined more precisely using some more pieces of information such as, e.g., engine rotational speed, throttle opening degree, intake pressure, fuel injection volume and so on. Where an engine torque signal is delivered from a suitable control device, e.g., engine computer (not shown) for controlling the engine 10, or where a real engine torque is detected by a sensor therefor, there may be set an upper limit value (Tul) for the command torque (T) in dependence on the engine torque so detected.

Although in the foregoing embodiment, the pre-torque map MTff, the compensation torque map MTfb have respectively stored therein various pre-torques (Tff) and various compensation torques (Tfb) which are added to be distributed to the sub-drive wheels Wrl, Wrr, there may be stored various rates at which the engine torque is to be distributed to the sub-drive wheels Wrl, Wrr where the real torque to be transmitted to the prime drive wheels Wfl, Wfr is detected by a suitable sensor. Needless to say, in addition to the front-wheel drive vehicles as exemplified in the foregoing embodiment, the present invention is also applicable to rear-wheel drive vehicles of the type wherein rear wheels work as the prime drive wheels while front wheels work as the sub-drive wheels.

Finally, various features and the attendant advantages of the foregoing embodiment are summarized as follows:

In the foregoing embodiment as shown in FIGS. 1 and 3, the torque transmitted from the engine 10 to the prime drive wheels Wfl, Wfr is distributed through the electromagnetic clutch 16 to the sub-drive wheels Wrl, Wrr on an on-demand basis. The command torque (T) is determined based on the vehicle speed (V), the throttle opening degree (θ) and the rotational speed difference (ΔN) between the prime drive wheels Wfl, Wfr and the sub-drive wheels Wrl, Wrr. The electromagnetic clutch 16 is controlled in dependence on the command torque (T) and transmits the engine torque depending on the command torque (T) to the sub-drive wheels Wrl, Wrr. At this time, since the command torque (T) is limited to the upper limit value (Tul) therefor in dependence on the engine torque detected then, the ECU 18 can be prevented from applying an excess current to the electromagnetic coil 19 of the electromagnetic clutch 16 and hence, from generating heat to raise its temperature when the engine torque is small. Thus, it becomes no longer necessary to use those circuit elements having small characteristic changes over a wide temperature range, so that the torque distribution control device can be precise in control operation and can be manufactured at a low cost.

In the foregoing embodiment as shown in typically FIG. 3, a pre-torque (Tff) is determined based on the vehicle speed (V) and the throttle opening degree (θ) in a feed-forward sense. The compensation torque (Tfb) is determined based on the the rotational speed difference (ΔN) between the prime drive wheels Wfl, Wfr and the sub-drive wheels Wrl, Wrr and the vehicle speed (V) in a feedback sense. The pre-torque (Tff) and the compensation torque (Tfb) are added for the command torque (T), depending on which the electromagnetic clutch 16 is controlled to transmit the engine torque to the sub-drive wheels Wrl, Wrr. At this time, since the command torque (T) is limited to the upper limit value (Tul) therefor or below in dependence on the engine torque detected then, the ECU 18 can be prevented from applying an excess current to the electromagnetic coil 19 of the electromagnetic clutch 16 and hence, from generating heat to raise its temperature when the engine torque (Te) is small. Thus, it becomes no longer necessary to use those circuit elements having small characteristic changes over a wide temperature range, so that the torque distribution control device can be precise in control operation and can be manufactured at a low cost.

In the foregoing embodiment as shown typically in FIG. 3, the engine torque (Te) is estimated from at least the engine rotational speed (Ne). Or, it is estimated from both of the engine rotational speed (Ne) and the throttle opening degree (θ). Then, the upper limit value (Tul) for the command torque (T) is determined based on the estimated engine torque (Te). Thus, it can be realized to estimate the engine torque with a simplified construction.

Obviously, numerous modifications and variations of the present invention are possible in light of the above teachings. It is therefore to be understood that within the scope of the appended claims, the present invention may be practiced otherwise than as specifically described herein.

What is claimed is:

1. A torque distribution control device for a four-wheel drive vehicle having an electromagnetic clutch for distributing to sub-drive wheels a torque transmitted from an engine to prime drive wheels and current apply means for applying a command electric current corresponding to a command torque to an electromagnetic coil of said electromagnetic clutch, said torque distribution control device comprising: command torque operation means for determining said command torque based on a vehicle speed, a throttle opening degree and a rotational speed difference between said prime drive wheels and said sub-drive wheels; and command torque limit processing means for limiting said command torque to an upper limit value therefor or below in dependence on an engine torque.

2. A torque distribution control device as set forth in claim 1, wherein said command torque operation means for determining said command torque is composed of pre-torque operation means for determining a pre-torque based on said vehicle speed and said throttle opening degree; compensation torque operation means for determining a compensation torque based on said rotational speed difference between said prime drive wheels and said sub-drive wheels and said vehicle speed; and addition means for calculating said command torque by the addition of said pre-torque to said compensation torque.

3. A torque distribution control device as set forth in claim 1, wherein said command torque limit processing means estimates said engine torque from at least the rotational speed of said engine and determines said upper limit value for said command torque based on said estimated engine torque.

4. A torque distribution control device as set forth in claim 3, wherein said command torque limit processing means estimates said engine torque from both of the rotational speed of said engine and said throttle opening degree.

* * * * *